(12) United States Patent
Ingraham et al.

(10) Patent No.: US 8,255,200 B2
(45) Date of Patent: Aug. 28, 2012

(54) CIRCUIT PROTECTION AND CONTROL DEVICE SIMULATOR

(75) Inventors: Edward Ingraham, Jonesborough, TN (US); David Otey, Montgomery, IL (US); Rüdiger W. Hausmann, Johnson City, TN (US); Elie G. Ghawi, St. Charles, IL (US)

(73) Assignee: Siemens Aktiengesellschaft, Munich (DE)

( * ) Notice: Subject to any disclaimer, the term of this patent is extended or adjusted under 35 U.S.C. 154(b) by 615 days.

(21) Appl. No.: 12/454,467

(22) Filed: May 18, 2009

(65) Prior Publication Data
US 2009/0299720 A1 Dec. 3, 2009

Related U.S. Application Data

(60) Provisional application No. 61/056,918, filed on May 29, 2008.

(51) Int. Cl.
G06F 17/50 (2006.01)
G06G 7/54 (2006.01)
G06F 9/45 (2006.01)
H02H 5/04 (2006.01)
G05B 13/02 (2006.01)

(52) U.S. Cl. ............... 703/14; 703/18; 703/22; 361/23; 361/24; 700/28; 700/29

(58) Field of Classification Search ............. 703/14, 703/18, 22; 361/23, 24; 700/28, 29, 21, 700/22
See application file for complete search history.

(56) References Cited

U.S. PATENT DOCUMENTS

| | | | | |
|---|---|---|---|---|
| 4,547,826 A * | 10/1985 | Premerlani | ............. | 361/25 |
| 4,743,818 A * | 5/1988 | Quayle et al. | ............. | 318/473 |
| 4,939,437 A * | 7/1990 | Farag et al. | ............. | 318/473 |
| 5,220,478 A * | 6/1993 | Innes et al. | ............. | 361/93.2 |
| 5,225,992 A * | 7/1993 | Kobari et al. | ............. | 702/58 |
| 5,539,601 A * | 7/1996 | Farag | ............. | 361/23 |
| 5,570,256 A * | 10/1996 | Schoen et al. | ............. | 361/31 |
| 5,963,724 A * | 10/1999 | Mantooth et al. | ............. | 703/14 |
| 6,234,963 B1 * | 5/2001 | Blike et al. | ............. | 600/300 |
| 6,283,631 B1 * | 9/2001 | Gousset et al. | ............. | 374/152 |
| 6,901,316 B1 * | 5/2005 | Jensen et al. | ............. | 700/286 |
| 7,005,856 B2 * | 2/2006 | Deak et al. | ............. | 324/418 |
| 7,035,064 B2 * | 4/2006 | Schimanek et al. | ............. | 361/23 |
| 7,161,778 B2 * | 1/2007 | Zocholl | ............. | 361/25 |
| 7,180,297 B2 * | 2/2007 | Deak et al. | ............. | 324/418 |
| 7,336,455 B2 * | 2/2008 | Dimino et al. | ............. | 361/24 |
| 7,366,648 B2 * | 4/2008 | Fujimori | ............. | 703/14 |
| 7,880,460 B2 * | 2/2011 | Plude et al. | ............. | 324/76.11 |
| 2002/0087220 A1 * | 7/2002 | Tveit et al. | ............. | 700/22 |
| 2003/0163296 A1 * | 8/2003 | Richards | ............. | 703/14 |
| 2005/0036256 A1 * | 2/2005 | Bolda | ............. | 361/93.1 |
| 2005/0122642 A1 * | 6/2005 | Plemmons et al. | ............. | 361/23 |
| 2005/0155043 A1 * | 7/2005 | Schulz et al. | ............. | 719/328 |
| 2006/0208673 A1 * | 9/2006 | Kling et al. | ............. | 318/66 |
| 2006/0250154 A1 * | 11/2006 | Gao et al. | ............. | 324/772 |
| 2007/0021873 A1 * | 1/2007 | Richards | ............. | 700/286 |
| 2007/0233286 A1 * | 10/2007 | Ishikawa et al. | ............. | 700/29 |
| 2007/0241920 A1 * | 10/2007 | Rodriguez et al. | ............. | 340/679 |
| 2007/0288220 A1 * | 12/2007 | Ehrmann et al. | ............. | 703/19 |
| 2009/0055156 A1 * | 2/2009 | Cooper | ............. | 703/22 |
| 2009/0299720 A1 * | 12/2009 | Ingraham et al. | ............. | 703/14 |

\* cited by examiner

Primary Examiner — Kamini S Shah
Assistant Examiner — Akash Saxena

(57) ABSTRACT

A power circuit protection and control device simulator emulates in real time identical circuit protection and control functions performed by the actual device being simulated and generates real time simulated operational information concerning at least one of the device or the power circuit. A human-machine interface, such as through a web browser, allows a user to input power circuit operational parameters, such as motor current and load, and device variable circuit protection and control operational parameters, such as trip class, ground fault detection or phase unbalance protection. The simulator displays in real time simulated operational information on the human-machine interface. The simulator may be used to simulate operation of an electronic overload relay and an electric motor controlled by the relay.

22 Claims, 6 Drawing Sheets

Welcome to the Siemens ESP200 Demo! — 220-0

Explore the operation of the Siemens ESP200 NEMA Solid-state Overload Relay with this interactive demonstration. Use the ESP200 controls to determine the device behavior under simulated load conditions.

Follow these Step-by-Step instructions to step up Full Load Amps, Trip Class and DIP-switches on the unit. Later, you will be able to energize the circuit and modify the load conditions.

Our simulated ESP200 behaves just like a real device. Feel free to experiment with the ESP200 settings, once you are familiar with the controls.

FIG. 4

Step 1 - Adjusting Initial Setting — 220-1

Use the simulated controls on the Overload Relay Faceplate to make these settings:
- Full Load Amps (FLA) Dial – 4 Amps
- Phase Unbalance – Off
- Reset Mode – Man
- Trip Class – 5
- Phases Loss – Off
- Ground Fault – Off On the Motor Control panel, adjust the values of the Motor Controls
- Load – 4 Amp
- Momentary/Maintained – Momentary
- Balance – 100%
- Trip Status should indicate "OK".
  If not, click on the Reset button.

FIG. 5

Step 2 - Simulating Overload Condition — 220-2 a) Click on the Start button and observe all the motor control indicators. The motor is running at 100% load or FLA. The motor should continue to run indefinitely at this load. Note the Thermal Memory bar does not fill 100% (Step four will explain the principal of thermal memory).
b) Click on the Stop button and the Reset Thermal Memory button.
c) Adjust the motor Load to 24 Amps (6 x FLA). At 600% the FLA dial setting and with the Trip Class set to 5, the overload relay will trip within five seconds. The trip class indicates the amount of time the overload relay will trip at a motor load of 600% FLA starting cold.
d) Clock on the Start button and observe the Runtime indicator. The overload relay will trip within 5 seconds.
e) Observe the color of trip indicator to the left of the Reset button. Also observe the Thermal Memory bar. It should have filled to 100% and will slowly decrease back to zero while the motor is off and cooling down.

FIG. 6

Step 3 - Resetting the Overload Relay — 220-3 a) Reset the overload relay by clicking on the Reset button.
The color of the trip indicator should have changed back to white indicating the overload relay is reset.
Also clear the thermal memory.

b) Adjust the motor Load somewhere between 200% and 500% FLA.
Repeat Step 2d (previous step) and Step 3 (this step) and observe how long it takes for the overload relay to trip.

FIG. 7

Step 4 - Illustrate Principal of Thermal Memory a) The thermal memory simulates the motor's temporal cooling function. The overload relay tracks the heat condition of the motor preventing motor burn-out due to repeated starts. If the motor has not cooled off sufficiently since the last trip condition and is still hot, the overload relay will trip even faster during the next overload condition.

b) Adjust the motor Load at 200% FLA and clear the thermal memory.

c) Start the motor and observe the Runtime indicator. Once the overload relay trips, reset the overload relay. Repeat this step until the overload relay trips practically instantaneously.

FIG. 8

Step 5 - Simulating Phase Loss a) Reset the thermal memory if the motor has not cooled off yet and reset the overload relay.

b) Switch Phase Loss on and adjust the motor Load to 4 Amps.

c) Start the motor and then click on the Simulate Phase Loss button. The overload relay should trip within three seconds. In fact, the overload relay should always trip within three seconds regardless of the trip class, motor load and thermal memory.

FIG. 9

Step 6 - Simulating Ground Fault a) Reset the overload relay and switch Ground Fault on.

b) Start the motor and then click on the Simulate Ground Fault button. The overload relay should trip within 400 milliseconds. In fact, the overload relay should always trip within 400 milliseconds regardless of the trip class, motor load and thermal memory.

FIG. 10

Step 7 - Illustrate the Auto Reset Mode a) Reset the thermal memory if the motor has not cooled off yet and reset the overload relay.

b) Switch Reset Mode to Auto and adjust the motor Load to 16 Amps (400% FLA) to simulate an overload condition. Also switch the Start/Stop buttons to Maintained.

FIG. 11

Step 8 - Start the Motor in Auto Reset Mode   220-8 a) Start the motor and observe both the Trip Status indicator and the Auto Reset time indicator. Once the overload relay trips, the Auto Reset timer should start to increment. At approximately 160 seconds, the overload relay should automatically reset itself. Since the Start button is maintained, the motor will be automatically reenergized. Be patient and get a coffee while you wait.

b) d. Allow the overload relay to trip again since the overload condition still exists. This time though, instead of waiting for the overload relay to automatically reset, click on the Reset button. This illustrates that the overload relay can be manually reset even while in automatic reset mode.

FIG. 12

Step 9 - Simulating Phase Unbalance   220-9 a) Switch the Start/Stop buttons to Momentary.

b) Switch Phase Unbalance on, Phase Loss off and Reset Mode to Manual. Reset the thermal memory.

c) Adjust the motor Load somewhere between 200% and 600% FLA and load Balance to 100%.

d) Start the motor and wait until the overload relay trips. Record the runtime.

e) Reset the thermal memory and reset the overload relay. Adjust the load Balance to 50%.

FIG. 13

Step 10 - Starting the Motor with Phase Unbalance   220-10 a) Start the motor and observe the Load Amps for L1, L2 and L3. Note that one phase is out of balance.

b) Observe the runtime once the overload relay trips. Due to the unbalanced load, the overload relay should have tripped sooner.

c) Reset the thermal memory and reset the overload relay. Switch Phase Loss on. Adjust the load Balance to some value less than 30%.

d) Start the motor and observe the run time. The overload relay should trip within three seconds. This is because the overload relay reacts to a phase unbalance of 70% or greater as a phase loss.

FIG. 14

Step 11 - Exploring   220-11

At this point, you should be familiar with the functionality of the ESP200 overload relay. You have also observed how it reacts to various situations to protect your motor and equipment/ Now go back and retest the various functions using different setting and motor conditions to further increase your familiarity with the ESP200 overload relay.

More information on the ESP200 is available in the chapter Learn more...

Click the orange Learn more... tab on the top right of the screen.

FIG. 15

CIRCUIT PROTECTION AND CONTROL DEVICE SIMULATOR

CLAIM TO PRIORITY

This application claims the benefit of our U.S. provisional patent application entitled "SYSTEMS, DEVICES, AND/OR METHODS FOR SIMULATING EQUIPMENT" filed May 29, 2008 and assigned Ser. No. 61/056,918, which is incorporated by reference herein.

BACKGROUND OF THE DISCLOSURE

1. Field of the Invention

The invention relates to power circuit protection and control device simulators. One embodiment of the present invention enables a user to simulate actual operation of a motor overload relay and electric motor, via a web browser, using at least some of the identical control parameters of the manufactured relay product. The simulator of the present invention is useful for training users in the operation of a control device and testing simulated operation in a non-destructive virtual environment, without risk of physical damage to actual power equipment. By way of example, a user can test intermittent operation of a simulated motor and overload relay under varying load test conditions envisioned in a future factory design, to determine whether the overload relay will trip due to simulated motor thermal overload, without having to configure an actual motor test bed. The simulator of the present invention also allows non-destructive virtual testing of new control functions, such as new thermal modeling protection algorithms prior to bench testing.

2. Description of the Prior Art

Electrical distribution and power circuit designers, engineers, maintenance technicians, equipment specification/purchasing managers and others in the field need to understand the features, functions and operational characteristics of residential, commercial and industrial electrical equipment. Given the complexities of modern electrical equipment components and electrical distribution system design environments, it is desirable to understand, prior to actual construction, how equipment will interoperate once connected to a working system.

In the past, longer construction lead times and relatively fewer variations of relatively simpler electrical equipment allowed designers to use best professional judgment and experience to design and specify electrical distribution systems. In due course, the system would be built and "debugged" as necessary in the field in order to achieve acceptable operational performance. Present shorter design and construction lead times, greater variation and complexity of equipment, and high repair and replacement cost of electrical equipment have created demand for pre-construction system performance verification.

One common electrical power system application in industrial and commercial environments is an electrical motor powering an intermittent, varying load. A motor overload relay is interposed between an electrical power source and the motor in order to protect the motor from overload conditions, such as a stalled or locked rotor, and overheating from excessive or rapid intermittent loads that do not allow the motor to cool sufficiently. The overload relay is sized, through equipment performance specification, control settings (i.e., maximum rated steady-state operational, maximum in-rush current during startup, permissible phase unbalance variations, etc.) and empirical testing, to protect the motor from overheating, yet avoid inadvertent nuisance tripping.

In the past, through professional judgment, experience and trial and error, an electrical system designer would attempt to match a motor and overload relay combination to be able to conform to the anticipated system design operational requirements. The designer could consult product specification sheets, time vs. current heat charts and the like to specify a particular rating and adjustment settings of a motor overload relay. Product specification, testing and configuration were heavily dependent upon the empirical experience of the designer. Upon actual construction, the combination would be tested and verified in the field. If the system overheated or was subject to nuisance tripping, different overload relay control adjustment settings would be tested. If performance remained unsatisfactory a different specification overload relay might be needed to replace the one in the initial design.

The time-consuming trial and error specification methodologies and development of designer professional experience had to be passed on to designer trainees. Need has long existed in the electrical system design arts to provide simulation training tools that would enable experienced design professionals to configure system designs in quicker fashion with minimal design corrections and to provide training experience for less experienced design trainees.

In the past there have been attempts to make electrical distribution circuit protection simulation apparatus that would enable a designer to mimic loads on multiple circuit breakers in a distribution system, so that faults could be isolated to the circuit breaker most closely associated with the fault node. Such systems essentially allowed computer-stored time/current charts to be overlayed, so that the correct circuit breaker size could be verified, as well as overload current settings (e.g., ground fault, instantaneous trip and other time/current settings). Time/current data were generally gathered empirically. For example, for a specific design and load capacity of an electric motor, acceptable performance time/current charts were derived so that motor heat capacitance operational limits were understood by designers. Generally such charts were created with conservative operational parameters, so as to minimize risk of motor damage.

As motor control electronics became more sophisticated, microprocessor-controlled overload relays were developed that could digitally model electrical motor heat capacitance and heat transfer in real time. An example of such motor controllers is described in U.S. Pat. No. 5,539,601, "Apparatus and Method for Thermal Protection of Electric Motors". Motor temperature overload control algorithms described in the patent allowed for more precise, real time evaluation of motor heat capacitance and heat transfer. Rather than select conservative control settings based on imperfect empirical data, the motor controller could more successfully model actual motor operating conditions, and if necessary cause a motor contactor to de-energize power to the motor before the motor became overheated. However, motor controllers of the type shown in U.S. Pat. No. 5,539,601 were intended for field application and not as virtual simulator test beds. Both the control algorithms and control settings had to be bench or field tested. It is desirable to confirm operability of control algorithms and control settings prior to bench testing or field installation.

Thus, a need exists in the art for an electrical power distribution system circuit protection and control simulator that enables designers to test and verify system designs and equipment configuration virtually. A need also exists in the art for an electrical power distribution system circuit protection and control simulator that enables design and maintenance professionals to learn about the interoperability, compatibility and operational characteristics of components in a "hands on" virtual environment.

SUMMARY OF THE INVENTION

These and other needs are achieved in accordance with the present invention by a power circuit protection and control device simulator that emulates in real time identical circuit protection and control functions performed by the actual device being simulated and generates real time simulated operational information concerning at least one of the device or the power circuit. A human-machine interface, such as a web browser, allows a user to input power circuit operational parameters, such as motor current and load and device variable circuit protection, as well as control operational parameters, such as trip class, ground fault detection or phase unbalance protection. The simulator displays in real time simulated operational information on the human-machine interface. The simulator may be used, for example, to simulate operation of an electronic overload relay and an electric motor controlled by the relay. Desirably the simulator is implemented on a web browser for easy use and application by electrical equipment design and maintenance professionals. The simulator of the present invention may be implemented in a client-server networked computer environment.

The present invention includes a power circuit protection and control device simulator having a processor. Memory, accessible by the processor, stores instructions executable by the processor to emulate in real time identical circuit protection and control functions performed by the actual device and generate real time simulated operational information concerning at least one of the device or the power circuit. A human-machine interface, such as a personal computer display, is coupled to the processor and is used for inputting to the processor at least one power circuit operational parameter and at least one variable circuit protection and control operational parameter performed by the actual device. The processor in turn emulates in real time the circuit protection and control functions based on user inputted parameters and displays in real time simulated operational information on the human-machine interface.

In one exemplary application, the simulator device can simulate an electronic motor overload relay and an electric motor. In this application all overload relay operation parameters can be simulated, including: motor load, motor phase unbalance percentage, phase loss, ground fault, full load current, continuous motor operation or intermittent motor operation. Circuit protection and control functions performed by the actual overload relay device are simulated, and include any one of motor overload, thermal overload, short circuit, ground fault or phase unbalance protection or heat capacitance/transfer thermal modeling algorithms. The simulation models employ the actual control algorithms of the real overload relay.

The present invention includes by way of example methods for operating the exemplary overload relay simulator, described above, including inputting to the processor with the human-machine interface at least one power circuit operational parameter and at least one variable circuit protection and control operational parameter performed by the actual device, with the processor, emulating in real time at least one protection and control function performed by the actual device and generating real time simulated operational information concerning at least one of the device or the power circuit. Thereafter the simulated operational information is displayed on the human-machine interface.

Desirably, the simulator of the present invention may include an additional reset feature that enables reset of the thermal modeling simulation, so that additional simulations may be run on a virtual "cooled-down" motor, without the need to wait for additional real time to allow for motor cooling, as would be done in an actual overload relay installed in a field application.

BRIEF DESCRIPTION OF THE DRAWINGS

The teachings of the present invention can be readily understood by considering the following detailed description in conjunction with the accompanying drawings, in which:

FIGS. 4-15 show an exemplary embodiment of the human-machine interface of the simulator displaying screen shots of step-by-step tutorial information window instructions for using features of the simulator.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in simulators for other electrical power distribution system circuit protection and control equipment.

1. Simulator Architecture

Figure 1:
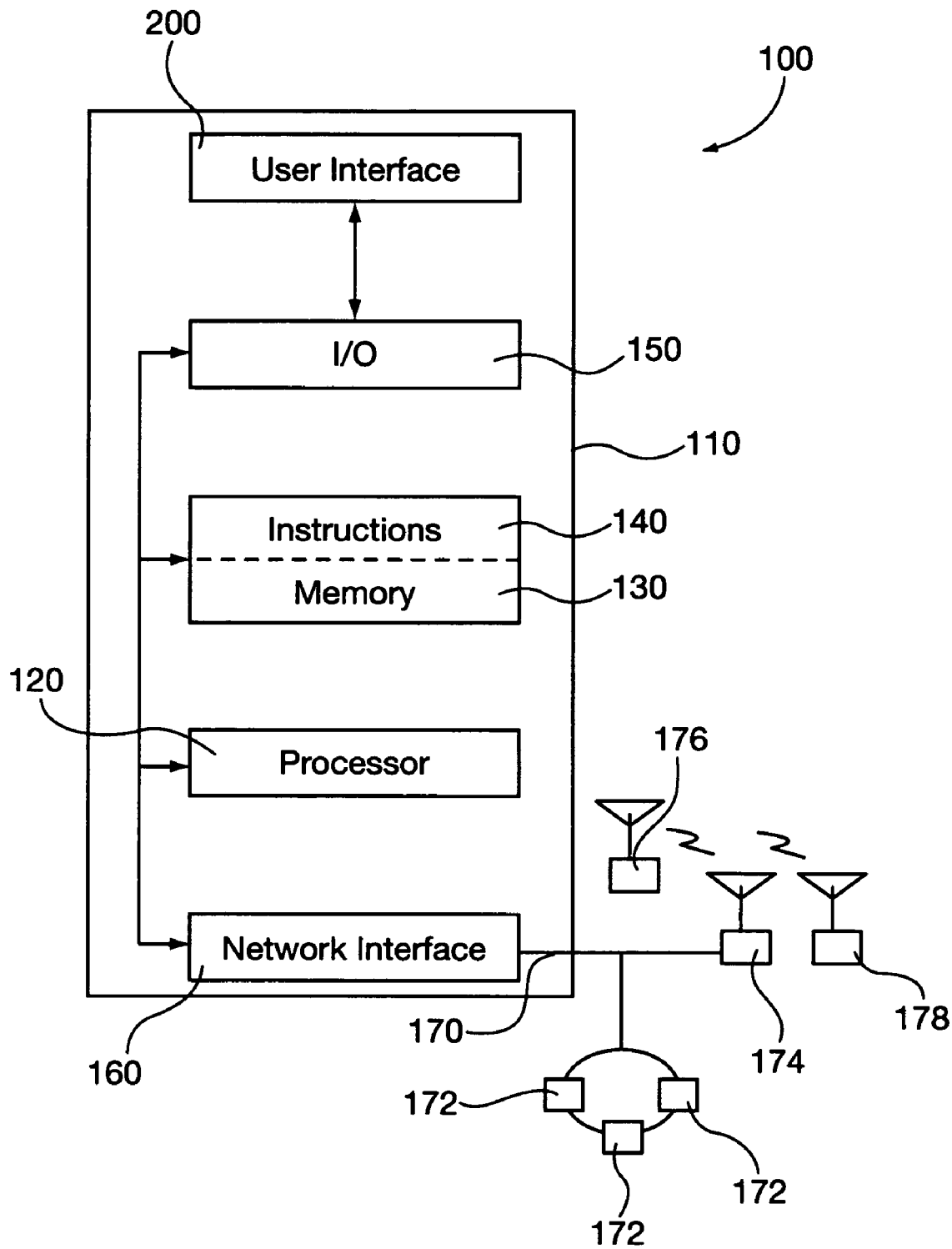
FIG. 1 shows a software block diagram of an exemplary embodiment of the simulator of the present invention.

Referring to the drawings, FIG. 1 is a block diagram of an exemplary embodiment of the simulator 100 of the present invention. The simulator 100 includes an information device 110 that in certain operative embodiments can comprise a computer server, a web server, personal computer, work station or personal digital assistant. The information device 110 includes a processor 120 and memory 130 accessible by the processor. The memory 130 can be any form of volatile or non-volatile electronic memory that is capable of storing analog or digital information. The memory 130 stores instructions 140 executable by the processor 120 in order to emulate in real time identical circuit protection and control functions performed by the actual device, e.g., an electronic overload relay for an electric motor with motor thermal protection functions. The information device 110 has an input/output (I/O) device 150 that is capable of communicating with one or more types of interface devices, discussed below.

The information device 110 of the exemplary embodiment shown in FIG. 1 also may have a network interface 160 for communication with one or more networks 170 and other devices 172 in communication with the network. The device 110 may be a server, including a web server that is in communication with client computers 172 via hard wired communication pathways or in a wireless communication network exemplified by receiver/transmitter 174 in communication with a wireless communication capable computer 176 or wireless personal digital assistant (PDA) 178. The network 170 may also include a local area network (LAN), wide area network (WAN), and the Internet. The simulator 100 desirably can be run in a browser and/or other web-enabled environment, including various forms of JAVA-script-enabled software, or FLASH® player environments, such as those offered by Adobe Systems. Alternatively, the simulator 100 may be a stand-alone system, such as a personal computer, that does not communicate with other devices during simulations.

The I/O device of information device 110 communicates with one or more human-machine user interfaces 200, that in exemplary embodiments can include a visual display, keyboard and cursor control mouse (not shown). The information device 100 can comprise any of numerous circuits and/or components, such as for example, one or more network interfaces 160, one or more processors 120, one or more memories 130 containing instructions 140, one or more input/output (I/O) devices 150, and/or one or more user interfaces 200 coupled to I/O device 150. In certain exemplary embodiments, via one or more user interfaces 200, such as a graphical user interface, a user can view a rendering of information related to specifying, ordering, designing, selling, manufacturing, and/or delivering a product, such as an electric motor and/or devices associated therewith.

2. Simulator Human-Machine User Interface

FIGS. 2-15 show an exemplary simulator embodiment displayed on human-machine user interface 200 computer display screen that is configured to simulate the Siemens ESP200 NEMA solid-state overload relay 205, sold in the United States of America by Siemens Energy & Automation, Inc. of Alpharetta, Ga. In this simulator screen 200 embodiment, the overload relay 205 is protecting a three phase, NEMA rated electric motor 215. As can be appreciated by those skilled in the art, the simulator of the present invention can be configured to simulate other types of circuit protection and control devices in power distribution circuits and protected electrical components other than motors, and the arrangement of display 200 features can be varied. For example, the display 200 may include a tutorial or other information window 220 for the benefit of users.

Figure 2:
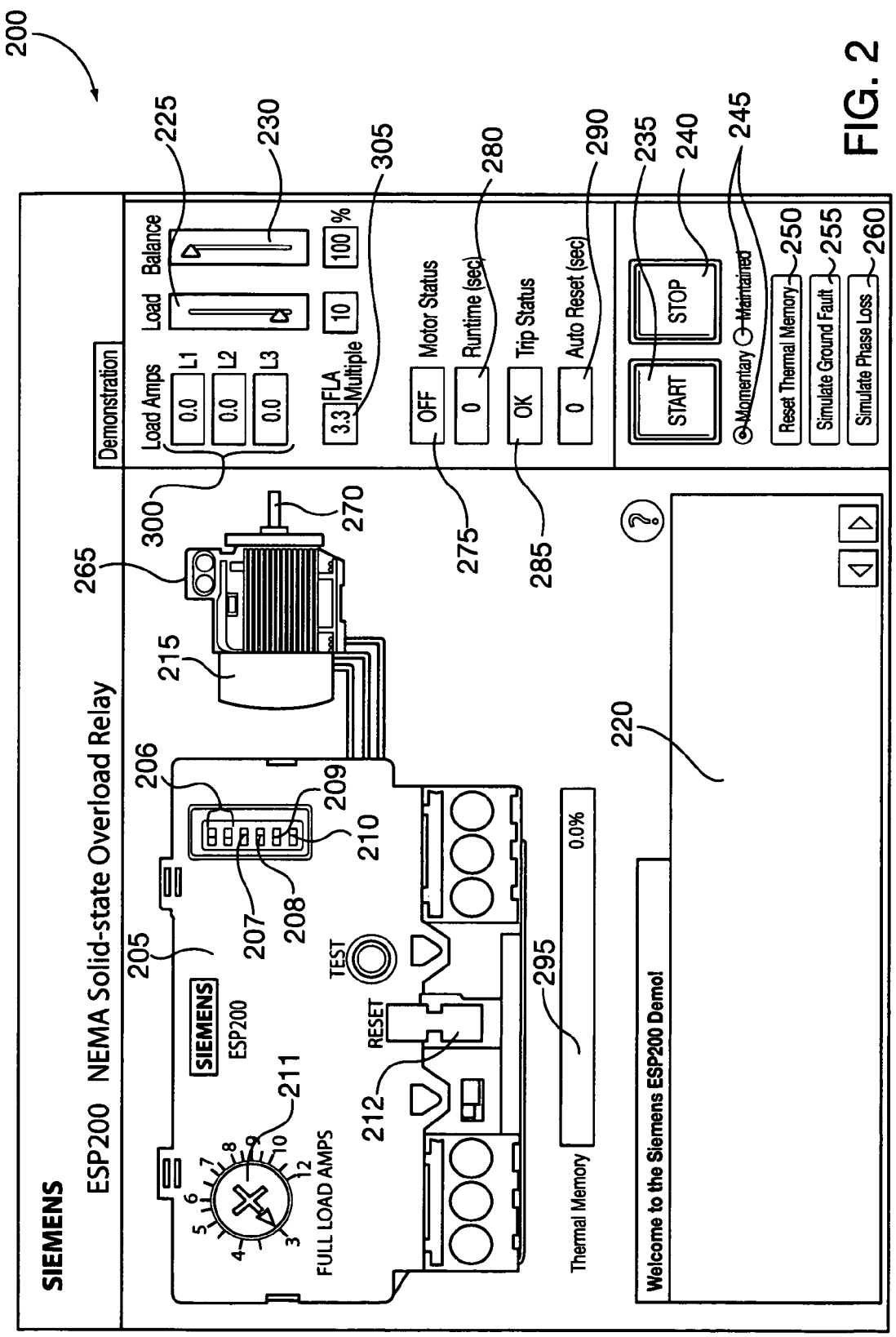
FIG. 2 shows an exemplary embodiment of the human-machine user interface of the simulator of the present invention, displaying a motor overload relay and electric motor prior to initialization of a simulation by a user.

In this exemplary embodiment of the simulator, shown in FIG. 2, the user can enter and/or specify any combination of the following circuit protection and control operational parameters through manipulation of a screen cursor via a computer mouse, as if the user were actually configuring an actual Siemens ESP 200 overload relay 205 control switches and buttons:

Trip Class DIP switches 206 (e.g., 5, 10, 20, 30);
Phase Unbalance DIP switch 207 (e.g., On or Off);
Phase Loss DIP switch 208 (e.g., On or Off);
Reset Mode DIP switch 209 (e.g., Manual or Automatic);
Ground Fault DIP switch 210 (e.g., On or Off);
Full Load Amps via rotary selector 211 (e.g., 3, 4, 5, 6, 7, 8, 9, 10, 11, 12 amps); and
Overload relay reset button 212.

Additionally, the power circuit operational parameters can be adjusted by the user through manipulation of motor operation environment screen 200 fields via a computer mouse, such as:

Motor load (L1) slider bar 225 (e.g., 0-85 A);
Phase balance slider bar 230 (e.g., 0-100%), where 100% means fully balanced, all phases equal;
Motor START button 235;
Motor STOP button 240;
Motor starter duration condition highlighted button 245 (e.g., Momentary start or Maintained, repeated start);
RESET THERMAL MEMORY button 250;
SIMULATE GROUND FAULT button 255; and
SIMULATE PHASE LOSS button 260.

Figure 3:
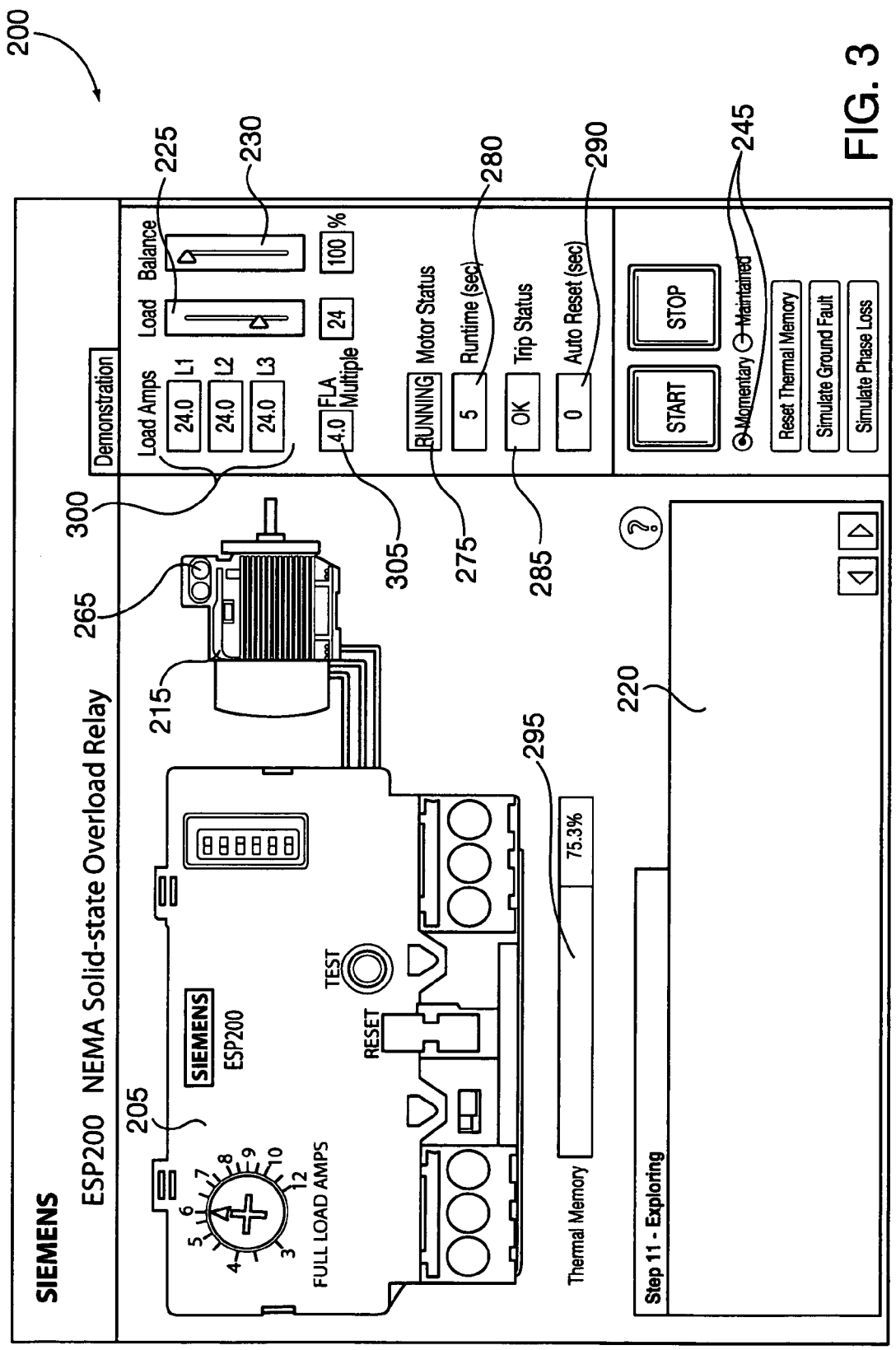
FIG. 3 shows an exemplary embodiment of the human-machine interface of the simulator displaying a motor overload relay and electric motor simulation in progress.

As shown in FIGS. 2 and 3, an exemplary simulation run display screen 200 can show simulated power circuit (e.g., motor 215) operational status information, including:

show the motor in "run" and/or energized mode versus "off" mode via a red or green light and/or dot 265;
display the motor's shaft 270 slowly turning;
indicate the Motor Status 275 as "OFF' or "RUNNING";
present the motor's Runtime in seconds 280;
show the motor's Trip Status 285;
show the overload relay AUTO RESET delay in seconds 290;
indicate a simulated Thermal Memory value 295 (i.e., percentage of allowable stored heat capacitance in the motor);
display the load amps on each phase 300; and
display the full load amps (FLA) multiple 305.

Note that this particular exemplary Siemens ESP 200 overload relay simulator display 200 of FIGS. 2 and 3 only simulates overload relay class 48, with a relay current range of 3-12 A. As those skilled in the art can appreciate, in this overload relay class, the current transformer ratio is 2600 and the burden resistor is 26.10 ohms.

FIGS. 3-15 show exemplary screen 200 step-by-step tutorial information window 220 instructions for using the overload relay 205. In these figures, the simulator is simulating a Siemens ESP200 overload relay. Screen 220-0 is an overview introductory message. Screen 220-1 suggests that the user adjust initial control parameter settings on the simulated overload relay 205 with a computer mouse. Screen 220-2 teaches the user how to simulate an overload condition, and screen 220-3 teaches resetting the relay 205 after a simulated overload condition.

The principles of thermal memory (i.e., motor retained heat capacitance and heat transfer) are taught in screen 220-4. Note that the availability of the RESET THERMAL MEMORY button 250 feature allows the user to wipe the thermal memory to simulate motor cooling to ambient temperature so that the user may promptly re-initiate simulated motor operation. Without this feature the motor thermal modeling algorithms utilized in the real Siemens ESP200 overload relay would not allow a real motor to start until sufficient time has elapsed to allow for ambient motor cooling.

Simulated phase loss and ground fault are taught in screens 220-5 and 220-6, respectively. Relay 205 auto reset features are taught in screens 220-7 and 220-8. Phase unbalance protection and control features are taught in screens 220-9 and 220-10. Screen 220-11 invites the user to experiment with the overload relay control settings and different motor operational parameters for additional training and familiarization.

3. Simulator Operation

The simulator 100 instructions 140 stored in the memory 130 enable processor 120 to emulate in real time the circuit protection and control functions performed by the actual device being simulated, based on user-inputted protection settings and power circuit operational parameters. Simulator 100 operation will now be explained with reference to the exemplary Siemens ESP200 overload relay described above and the user interface 200 configuration settings shown in FIGS. 2 and 3.

Once the user clicks on the START button 235, the simulator 100 can then calculate the simulated motor currents, as follows:

L1 specified by user (slider bar 225)
L2=L1
L3=L1* Phase Balance specified by user For each of the motor's 3 phases, the simulator 100 can calculate N, the thermal increment per time period, from the following equation:

$$N(L1) = \frac{\text{I\_Motor}(L1) \times \text{R\_Burden} \times \sqrt{2}}{\text{n\_current\_transformer} \times \pi \times 510 \text{ k}\Omega \times 4 \text{ }\mu\text{A}} \times 9450$$

where:
N(Lx)=the thermal increment per time period for the specified phase;
I_Motor(Lx)=the motor current (amps) for the specified phase;
R_Burden=the burden resistance, which can depend on the overload relay class;
N_current_transformer=current transformer ratio, which can depend on the overload relay class; and
the 510 kΩ value, 4 μA value, and 9450 constant are associated with this model overload relay.

The simulator 100 can then calculate A_max, the maximum periodic thermal increment from the following equation:

$$A\_\max = \max(N(L1), N(L2), N(L3))$$

The simulator 100 can then calculate P_Max, which can reflect the motor current unbalance and is zero if the phase balance is 100%, from the following equation:

$$P\_\max = \max(abs(N(L1) - N(L2)), abs(N(L2) - N(L3)), abs(N(L3) - N(L1)))$$

Next the simulator 100 looks up Tw from the following table stored in memory 130, which can recalibrate the algorithm to execute once each 500 milliseconds versus the original 192 milliseconds, and/or can alter the calculation to account for the Trip Class for this particular overload relay.

| Trip class | Tw |
|---|---|
| 5 | 2.9 |
| 10 | 2.9/2 |
| 20 | 2.9/4 |
| 30 | 2.9/6 |

Using the full load amperage (FLA) value specified by the user with selector switch 211, the simulator 100 can select a threshold from the following table:

| FLA | Threshold |
|---|---|
| 3 | 4832 |
| 4 | 6368 |
| 5 | 7936 |
| 6 | 9616 |
| 7 | 11344 |
| 8 | 13024 |
| 9 | 14544 |
| 10 | 16240 |
| 11 | 17648 |
| 12 | 19168 |

Next, the simulator 100 can iteratively calculate motor model ("MM") values at each 500 millisecond interval, as shown in the following equations. This calculation can estimate the exponential heating effects of the current flowing through the motor 215. If the MM value exceeds the threshold, the simulator 100 can simulate a trip of the overload relay 205. When the relay 205 trips, the simulator 100 can drop the motor current to zero and the calculated MM value can gradually decrease, just as would occur in an actual motor.

$$MM\_0 = 0$$

$$MM\_1 = MM\_0 + Tw*(-MM\_0/128 + A\_\max/2 + P\_\max/4)$$

$$MM\_2 = MM\_1 + Tw*(-MM\_1/128 + A\_\max/2 + P\_\max/4)$$

$$MM\_3 = MM\_2 + Tw*(-MM\_2/128 + A\_\max/2 + P\_\max/4)$$

And so on.

When, for example, the phase unbalance is to approximately 70% or greater and the value of the phase loss variable is switched to "On" (DIP switch 208), the simulator 100 can simulate a phase loss and an associated trip. Likewise, when, for example, the value of the ground fault variable is switched to "On" (DIP switch 210), the simulator can simulate a ground fault by pressing SIMULATE GROUND FAULT button 255 and thereby initiate a simulated associated trip.

Thus, after clicking the START button 235, the user can observe the motor control indicators for values generated by the simulator, including load amps 300, full load amperage (FLA) multiple 305, motor status 275, motor run time 280, trip status 285, auto reset time 290 and thermal memory percentage 295.

Although various embodiments which incorporate the teachings of the present invention have been shown and described in detail herein, with respect to an exemplary motor overload relay and electric motor simulator, those skilled in the art can readily devise many other varied simulator embodiments for other circuit protection and control devices and other electrical equipment within a power circuit that still incorporate these teachings.

What is claimed is:

1. A simulator for a power circuit protection and control device comprising:
 a processor;
 memory coupled to the processor, the memory storing instructions executable by the processor to simulate in real time an operation of the power circuit protection and control device and to simulate in real time a coupled power circuit, the simulator replicating at least one circuit protection and control function performed by a non-simulated power circuit protection and control device;
 a human-machine graphical user interface coupled to the processor for inputting to the simulator at least one operational parameter of the power circuit and at least one operational parameter of the non-simulated power circuit protection and control device; and
 wherein the processor simulates in real time the at least one circuit protection and control function based on the inputted parameters, generates in real time simulated operational information of the circuit protection and control device and displays the real time simulated operational information on the human-machine graphical user interface.

2. The simulator of claim 1, further comprising a simulation reset device, operable through the human-machine graphical user interface, for causing the simulator to selectively reset initial operating conditions of the power circuit protection and control device.

3. The simulator of claim 1, wherein the circuit protection and control device is an electronic motor overload relay, the simulated power circuit includes an electric motor, and the power circuit operational parameter includes one of a motor load, a motor phase unbalanced percentage, a phase loss, a ground fault, a full load current, or a continuous or intermittent motor operation.

4. The simulator of claim 3, wherein the input at least one operational parameter of the non-simulated power circuit protection and control device includes one of a motor overload, a thermal overload, a short circuit, a ground fault, a phase unbalance protection or a thermal model.

5. The simulator of claim 1, wherein the human-machine graphical user interface includes a media player software application operating within a web browser.

6. The simulator of claim 1, wherein the memory also stores instructions executable by the processor to display on the human-machine graphical user interface step-by-step instructions on how to use the simulator.

7. The simulator of claim 1, wherein the processor and the coupled memory is included within a web server that is in communication with a software application within a web browser, the software application within the web browser including the human-machine graphical user interface for inputting the at least one operational parameter of the power circuit and the non-simulated circuit protection and control device, the web server communicating the real time simulated operational information to the software application within the web browser.

8. A simulator for a power circuit protection and control device comprising:
   a processor;
   memory coupled to the processor, the memory storing instructions executable by the processor to cause a software application operating within a web browser to simulate in real time the operation of the power circuit protection and control device and to simulate in real time a coupled power circuit, the simulator replicating at least one circuit protection and control function performed by a non-simulated power circuit protection and control device;
   a graphical user interface within the software application for inputting to the simulator at least one operational parameter of the power circuit and at least one operational parameter of the non-simulated circuit protection and control device; and
   wherein the processor simulates in real time the at least one circuit protection and control function based on the input operational parameters, generates in real time simulated operational information of the circuit protection and control device, and displays the real time simulated operational information within the web browser.

9. The simulator of claim 8, further comprising a simulation reset device, operable through the human-machine graphical user interface, for causing the simulator to selectively reset initial operating conditions of the power circuit protection device.

10. The simulator of claim 8, wherein the circuit protection and control device is an electronic motor overload relay, the simulated power circuit includes an electric motor, and the power circuit operational parameter includes one of a motor load, a motor phase unbalanced percentage, a phase loss, a ground fault, a full load current, or a continuous or intermittent motor operation.

11. The simulator of claim 10, wherein the input at least one operational parameter of the non-simulated power circuit protection and control device includes one of a motor overload, a thermal overload, a short circuit, a ground fault, a phase unbalance protection or a thermal model.

12. The simulator of claim 8, wherein the software application operating within a web browser is a media player software application.

13. The simulator of claim 8, wherein the memory also stores instructions executable by the processor to display on the human-machine graphical user interface step-by-step instructions on how to use the simulator.

14. The simulator of claim 8, wherein the processor and the coupled memory is included within a web server that is in communication with the software application operating within the web browser, the software application within the web browser for inputting the at least one operational parameter of the circuit protection and control device to the web server and the web server communicating the real time simulated operational information to the software application operating within the web browser.

15. A method for simulating the functioning of a circuit protection and control device the method performed by a simulator for simulating in real-time the operation of the circuit protection and control device and for simulating in real time a coupled power circuit, the simulator replicating at least one circuit protection and control function performed by a non-simulated power circuit protection and control device, the simulator having a processor, an associated memory for storing instructions executable by the processor to perform the simulation and information generation functions, and a human-machine graphical user interface coupled to the processor, the method comprising:
   inputting to the processor with the human-machine graphical user interface at least one operational parameter of the power circuit and at least one operational parameter of the non-simulated circuit protection and control device;
   with the processor,
      simulating in real time at least one protection and control function performed by the circuit protection and control device;
      generating real time simulated operational information concerning the circuit protection and control device; and
      displaying the real time simulated operational information with the human-machine graphical user interface.

16. The method of claim 15 further comprising selectively resetting the simulator to restore initial operating conditions to the circuit protection and control device.

17. The method of claim 16, wherein the step of resetting includes resetting a thermal model associated with the power circuit.

18. The method of claim 15 wherein the circuit protection and control device is an electronic motor overload relay and the power circuit includes an electric motor and wherein the power circuit operational parameters include one of a motor load, a motor phase unbalanced percentage, a phase loss, a ground fault, a full load current, or a continuous or intermittent motor operation.

19. The method of claim 18, wherein the input at least one operational parameter of the non-simulated power circuit protection and control device includes one of a motor overload, a thermal overload, a short circuit, a ground fault, a phase unbalance protection or a heat thermal model.

20. The method of claim 15, wherein the display step is performed in connection with a software application operating within a web browser.

21. The method of claim 15 further comprising displaying step-by-step instructions on how to use the simulator on the human-machine graphical user interface.

22. The method of claim 15, wherein the simulation is performed on a web server incorporating the processor and the human-machine graphical user interface is used to input the at least one power circuit operational parameter and the at least one operational parameter of the circuit protection and control device to the web server, and the web server communicates the real time simulated operational information to the human machine graphical user interface.

* * * * *